United States Patent Office 2,833,771
Patented May 6, 1958

2,833,771

PROCESS FOR THE PREPARATION OF RESERPINE

Robert Schwyzer, Riehen, and Johannes Mueller, Arlesheim, Switzerland, assignors to Ciba Pharmaceutical Products, Inc., Summit, N. J.

No Drawing. Application February 24, 1955
Serial No. 490,426

Claims priority, application Switzerland
February 26, 1954

5 Claims. (Cl. 260—287)

This invention relates to a novel process for preparing reserpine. In the copending application Serial No. 367,357, filed July 10, 1953, by Emil Schlittler et al., now Patent Number 2,752,351, there is described a process for the manufacture of the alkaloid reserpine and its salts. That process consists in isolating the alkaloid reserpine from extracts having a sedative action and which are obtainable from plants of the Rauwolfia type with the use of weakly polar or non-polar solvents which are only partially miscible with water and preparing the salts of reserpine. The production of the said extracts used as starting materials may consist, according to that application, for example, in adsorbing the reserpine on a carrier substance from an acid, for example, an acetic acid extract having a sedative action and obtained from Rauwolfia plants, advantageously after formation of sparingly soluble salts thereof, and then isolating the reserpine with the use of a solvent as mentioned above. For example, an acetic acid extract of the root material of *Rauwolfia serpentina* Benth. is mixed with "Hyflo" Super Cel (diatomaceous earth) and then with sodium nitrate, sodium chloride and calcium hydroxide, the precipitate is filtered off with suction and extracted with a mixture of methanol and chloroform. The extract is then agitated with water and a saturated solution of sodium bicarbonate (pH value 8.5-9), and the chloroform solution is worked up to obtain reserpine, after being washed with sodium chloride solution.

According to the present invention it has been found that reserpine and salts thereof can also be obtained in pure form from Rauwolfia plants, by isolating reserpine from Rauwolfia plants using a solvent completely miscible with water, without the use of a weakly polar or non-polar solvent only partially miscible with water, with the formation of a reserpine salt, and simultaneously or subsequently purifying and isolating reserpine in pure form, if desired, in the form of a salt thereof, and, if desired, converting resulting salts of reserpine into the base. It is thus possible to separate reserpine while forming one of the salts thereof in solid form from an extract having a sedative action and obtained from Rauwolfia plants by using a solvent completely miscible with water, to purify the residue using a solvent completely miscible with water, and simultaneously or subsequently to purify and isolate reserpine in pure form, if desired in the form of a salt thereof.

The Rauwolfia extracts having a sedative action and used as starting materials can, for example, be prepared by extraction from Rauwolfia plants, especially the root powder thereof, with alcohols, such as methanol or ethanol, or with an aqueous acid agent, such as dilute acetic acid, as described, for example in the above mentioned application.

To separate reserpine with the formation of a salt thereof, the said extract is treated advantageously with a salt or an acid suitable for forming a reserpine salt sparingly soluble in water, if desired, in the presence of a carrier substance, such as diatomaceous earth or another silicate, especially with a heavy metal complex salt suitable for forming sparingly soluble alkaloid salts, for example, a phospho-tungstate, phospho-molybdate, mercury iodate, but more especially a reineckate or nitrate, or a chloride, sulfate, picrate, picrolonate, perchlorate or sulfonate, such as a helianthate or a corresponding acid thereof. This reaction is advantageously carried out in alcoholic, methanolic or ethanolic solution, or for example, acetonic solution, with the use of a salt, such as for example, ammonium reineckate, advantageously in the presence of an acid, such as hydrochloric acid. The resulting alkaloid salt is precipitated, if desired, by the addition of water, and, if desired, with the removal of the organic solvent. Alternatively, the extract may be treated in aqueous acid, for example, acetic acid solution with the acid or the salt, and when a salt is used, such as for example, ammonium reineckate, it is of advantage to work at a pH value of about 2, the reserpine salt separating. An advantageous method of this kind also consists, for example, in treating an acetic acid solution with a nitrate, such as sodium nitrate, advantageously in the presence of a compound having a salting-out action, such as sodium chloride.

The resulting residue can be purified according to the process by separating the reserpine salt in the usual manner, for example by treatment with an adsorption agent, advantageously one of moderate activity and neutral reaction, such as Hyflo or another diatomaceous earth. The adsorption may be carried out as a simple chromatography, or as a distribution chromatography, for example, over cellulose columns. The aforesaid adsorption may also be carried out by forming the salt in the presence of the adsorption agent. In order to separate the reserpine salt the mixture may also be subjected to fractional crystallization.

Purification can be carried out also by liberation of the reserpine base from the reserpine salt in the residue obtained according to the process of the invention and isolation of the reserpine formed. Thus, for example, the reineckate may be converted into the base by treatment with methanolic ammonia or by reaction with a suitable heavy metal compound, such as a silver or mercury salt, and separating the metal reineckate formed. From the reserpine reineckate the reserpine base can also be liberated by treatment with a base-liberating adsorbing agent, such as alumina of activity II (according to Brockman). The isolation of the base may also be carried out for example, by fractional crystallization, advantageously in acetone or an alcohol, such as methanol or ethanol, or adsorption, for example, on alumina. The liberation and isolation of reserpine can also be carried out in the same operation. To this end the reserpine reineckate may, for example, be chromatographed over alumina, the reserpine base being liberated and simultaneously isolated.

Purification and isolation of reserpine in pure form, if desired in the form of a salt thereof, is advantageously carried out by crystallization. However, it is also possible to obtain the pure product from crude reserpine or a salt thereof obtained by the foregoing operations, for example, by adsorption, such as chromatography, and subsequent crystallization. Reserpine is advantageously crystallized from methanol or from acetone or a mixture of chloroform and ether. This isolation can also be carried out together with the purification operations of said residue, for example, by fractional crystallization, or adsorption.

Depending on the procedure used, the reserpine is obtained in the form of its base or a salt thereof. The base can be liberated from the salts in the usual manner.

The following examples illustrate the invention, the parts being by weight unless otherwise stated, and the relationship of parts by weight to parts by volume being the same as that of the gram to the cubic centimeter:

Example 1

2000 parts of ground roots of *Rauwolfia serpentina* Benth. are extracted by stirring with a total of 20,000 parts by volume of acetic acid of 15 percent strength, and there are obtained 13,300 parts by volume of extract solution.

5,000 parts by volume of this solution are mixed with 40 parts of Hyflo Super Cel, and then there are added in succession, while stirring well, 42 parts of finely pulverized sodium nitrate and 410 parts of sodium chloride. 100 parts of burnt lime are slaked with 100 parts by volume of water, and then added to the above mixture in small portions while stirring and cooling with ice. The whole is stirred for a further hour, filtered with suction through a filter cloth, and the residue is dried in vacuo at 30° C. There are obtained 60.3 parts of a dry residue.

20 parts of the above residue are extracted by being triturated in a mortar first with 100 parts by volume, and then twice with 50 parts by volume on each occasion of a mixture of 90 parts by volume of methanol and 10 parts by volume of concentrated aqueous ammonia solution. The combined extracts obtained after filtration are evaporated to dryness in vacuo, whereby a yellow-brown residue amounting to 5.2 parts is obtained.

3.75 parts of this residue are taken up in a mixture of 5 parts by volume of methanol and 95 parts by volume of acetone, and adsorbed over a column of 100 parts of neutral aluminum oxide of activity III according to Brockmann. Elutriation is carried out with the same solvent mixture. The first fraction of 180 parts by volume of elutriate is evaporated to dryness, and by taking up the residue in a small amount of methanol reserpine crystallizes in a pure form, melting at 262–263° C. (with decomposition).

Example 2

3000 parts of ground roots of *Rauwolfia vomitoria* Afz. are extracted under reflux with 14,000 parts by volume of methanol. After evaporation of the solvent under reduced pressure there are obtained 284 parts of a dry residue.

98 parts of this residue are dissolved in 500 parts by volume of acetic acid of 15 percent strength, advantageously with the addition of methanol. Undissolved matter is removed by filtration. Half of this solution is given a pH value of 2 by the addition of hydrochloric acid, and the reserpine reineckate in admixture with accompanying substances precipitated by adding dropwise, while stirring and cooling with ice, a solution of 50 parts of ammonium reineckate in 1000 parts by volume of a mixture of glacial acetic acid and water. The mixture is suction-filtered, the residue washed with 100 parts by volume of hydrochloric acid of 0.1 percent strength and dried at 40° C. under reduced pressure. 16.7 parts of reserpine reineckate in admixture with accompanying substances are obtained. 0.5 part of this mixture is dissolved in a small quantity of acetone and placed on to a high column of 40 parts of neutral aluminum oxide of activity II (according to Brockmann). On elutriation with acetone, there appears first the reserpine base liberated from the reineckate by the absorbing agent. After recrystallization from methanol, the base melts at 262–263° C.

What is claimed is:

1. In a process for the preparation of reserpine from Rauwolfia plants, the steps which comprise extracting crude root material of Rauwolfia plants exclusively with a solvent selected from the group of acetic acid, methanol and ethanol, treating the resulting extract in the presence of an acid with a member of the group consisting of a Reinecke's salt and a salt of nitric and hydrochloric acid to precipitate a sparingly soluble salt of reserpine, separating the precipitated salt and setting free reserpine by treatment of the salt with a base liberating agent using as diluent exclusively a completely water-miscible solvent of the group consisting of lower alkanols and acetone.

2. A process as set forth in claim 1, wherein the sparingly water soluble salt is reserpine reineckate.

3. A process as set forth in claim 1, wherein the sparingly water soluble salt is reserpine nitrate.

4. A method as set forth in claim 3, wherein the nitrate is treated with alcoholic ammonia.

5. A method as set forth in claim 2, wherein the reineckate is treated with aluminum oxide in acetone.

References Cited in the file of this patent

UNITED STATES PATENTS 2,752,351    Schlittler et al. _____ June 26, 1956

FOREIGN PATENTS 521,626    Belgium _____ Jan. 23, 1954

OTHER REFERENCES

NaturwissenSchaften, vol. 39, page 553 (1952) (Horhammer).

J. Indian Chem. Society, vol. 18 (January 1951) (author Mookerjee), pages 33–39.

Helv. Chim. Acta, vol. 33, pages 1470–1477 (1950).